Feb. 16, 1960     T. W. MILLIGAN     2,925,301
VEHICLE BODY HEATED FLOOR CONSTRUCTION
Filed Aug. 1, 1958     2 Sheets-Sheet 1
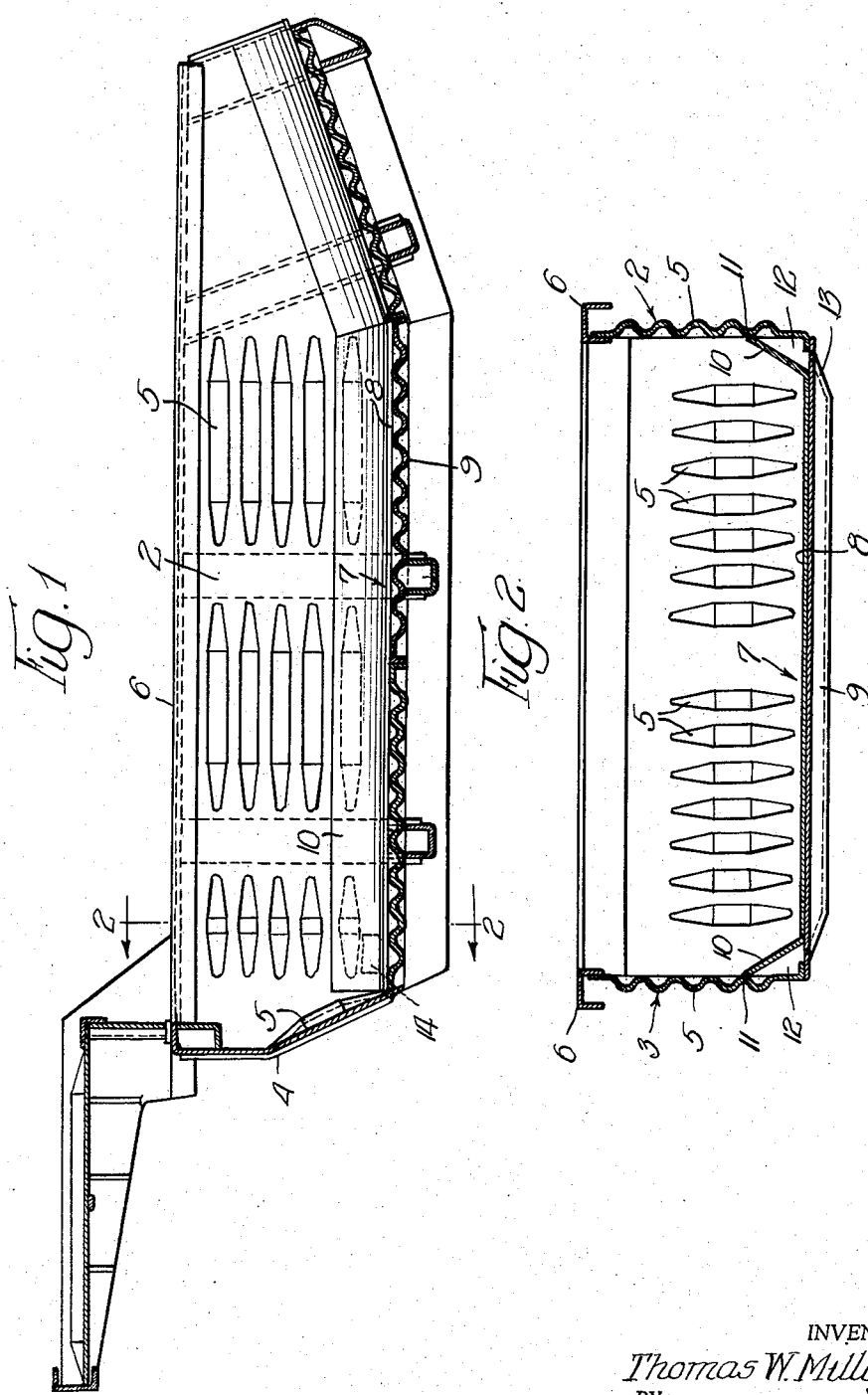
INVENTOR.
Thomas W. Milligan,
BY

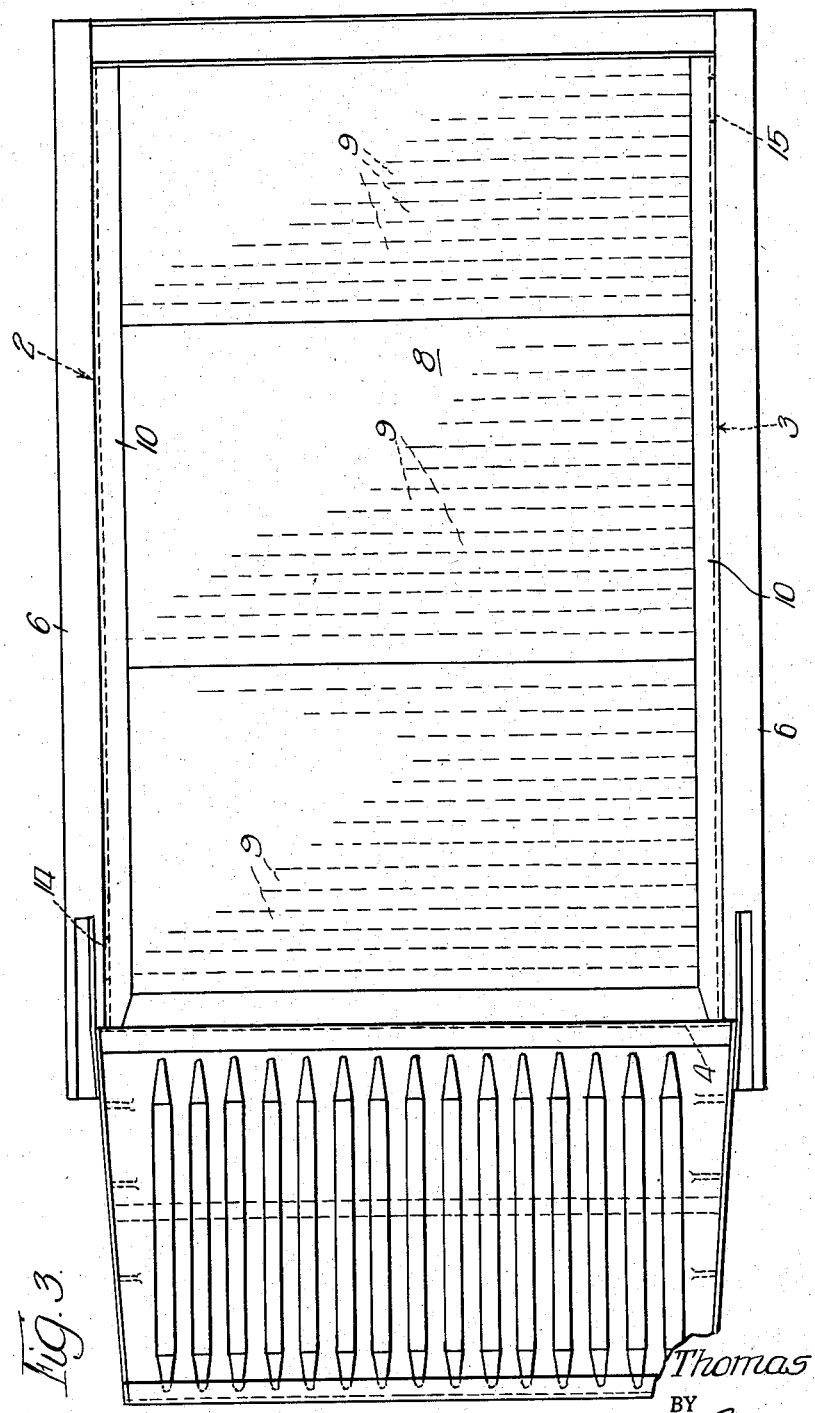

United States Patent Office 2,925,301
Patented Feb. 16, 1960

2,925,301
VEHICLE BODY HEATED FLOOR CONSTRUCTION
Thomas W. Milligan, Hinsdale, Ill., assignor to Standard Railway Equipment Manufacturing Company, Chicago, Ill., a corporation of Delaware
Application August 1, 1958, Serial No. 752,446
3 Claims. (Cl. 296—28)

This invention relates to vehicle bodies, and especially to bodies of vehicles that are adapted to move large discrete masses of material, such as earth moving equipment.

More specifically, the invention is directed to a vehicle body of the kind described having associated with its bottom and/or sides a conduit system, through which fluids can be passed, usually for the purpose of heating the burden of the vehicle. The invention is illustrated as applied to a trailer body that is adapted to be pulled by a tractor, the contents of which when loaded are discharged by the tipping of the body by raising its forward end so as to dump the contents over the tail-gate portion.

It has been known heretofore to provide vehicles with various types of double bottoms in order to canalize hot fluids therethrough so as to heat the contents; and it has also been known heretofore to provide tubing either within or below the bottom of such a vehicle for like purposes.

It is the principal object of the present invention to provide a novel construction of vehicle wall or bottom, preferably the latter, in a simplified way that does not materially increase the cost of the vehicle body, but which adds greatly to the strength and usefulness thereof.

In the drawings:

Figure 1 is a longitudinal mid-sectional elevational view of a trailer body embodying the present invention;

Figure 2 is a section taken along line 2—2 of Figure 1, looking in the direction of the arrows; and Figure 3 is a plan view of the construction shown in Figures 1 and 2.

Referring now more particularly to the drawings, the illustrated embodiment of the present invention comprises a trailer body composed of a right side wall 2, a left side wall 3, and an end wall 4, formed of sheet metal stock, within which corrugations 5 have been impressed for strengthening and stiffening the walls. A channel member 6 is also provided to extend around top edges of the side walls and end wall to provide a wide bulb properly to finish the top edges of the sheet metal and to provide a stiffening frame for the assembly.

The bottom 7, which connects the side walls, is composed of two plies of sheet metal, the upper ply 8 being shown as a smooth plate, and the bottom ply being shown as a corrugated plate 9 having its corrugations extending transversely of the vehicle body. It will be obvious that the relationship between these plates could be reversed, or that both could be corrugated if it would not be objectionable to have other than a smooth surface within the vehicle body to assist in the discharge of the contents.

As is best seen in Figure 2, the upper ply 8 is turned upwardly at its longitudinal margins 10 so as to become spaced from the bottom ply 9, the edges of which are sealed as by welding at 11 to form an enclosed chamber 12 adjacent the side and bottom walls of the vehicle that shall hereinafter be referred to as the manifolds 12, for reasons immeditaely to appear.

The corrugations in the bottom ply 9 are graded into the plane of the stock from which it is formed, as at 13, so as to become progressively shallower until they disappear adjacent the side edges of the bottom ply. Each of the corugations at its opposite ends underlies the manifolds 12, so as to be in open communication therewith. A fluid that is admitted to the right hand manifold at 14 in Figure 3 is caused to enter the conduits formed by the corrugations of the bottom ply 9 in cooperation with the top ply 8 and flow therethrough to the opposite manifold, from whence it is exhausted, as at 15, at the diagonally opposite corner of the body.

It is intended that the exhaust gases, as from a Diesel tractor employed to pull a trailer of the kind described, will be coupled to the intake opening 14, and thus supply a heated flow of gases through the conduits just described until they are discharged into the ambient atmosphere through the outlet port 15. There is thus provided a simple, strong, and highly useful double-wall construction which may be heated so as to defreeze any moist material that may repose in the vehicle body, such as wet earth, which becomes frozen during cold weather operations.

It is obvious that other variations in the construction are admissible without departing from the spirit of the invention which is apprehended in and by the following claims:

What is claimed is:

1. A vehicle body comprised of side and bottom walls, a manifold associated with a side wall adjacent said bottom wall, said bottom wall being formed of two plies of metal sheet stock connected together; the upper of said plies along its side margins being offset from the other ply, the edges of the offset portions being sealed to adjacent side walls so that the offset portions and the included portion of the side walls form said manifolds, the other one of said plies having corrugations therein, said corrugations in cooperation with the upper ply defining fluid conduits extending across said bottom wall, said conduits terminating in said manifolds in open communication therewith, and means for admitting fluid to said manifold for distribution to and circulation through said conduits.

2. A vehicle body comprised of side and bottom walls, said bottom wall being formed of two plies of metal sheet stock connected together; one of said plies along one of its margins being offset with respect to the other ply in spaced relation thereto, the edge of said offset portion being sealed to an adjacent side wall to define a manifold; the other of said plies having corrugations therein, said corrugations in cooperation with said first mentioned ply defining fluid conduits extending across said bottom wall normal to said manifold, said conduits terminating in said other ply in open communication with said manifold, and means for admitting fluid to said manifold for distribution to and circulation through said conduits.

3. A vehicle body bottom comprised of two plies of sheet metal secured together, the upper ply being flat and along its opposed side margins being offset at an angle with respect to the other ply defining triangular manifolds therebetween, the lower ply having coplanar side and end margins, corrugations pressed downwardly from the plane of said lower ply extending normal to and terminating in open communication with said manifolds, said corrugations in cooperation with said upper ply forming conduits extending between said manifolds, means for admitting fluid to the front end of one of said manifolds, and means for exhausting fluid from the rear end of the other of said manifolds.

References Cited in the file of this patent
UNITED STATES PATENTS

| | | |
|---|---|---|
| 1,942,207 | Ferwerda | Jan. 2, 1934 |
| 2,595,028 | Vutz | Apr. 29, 1952 |

FOREIGN PATENTS

| | | |
|---|---|---|
| 746,737 | Great Britain | Mar. 21, 1956 |